(12) United States Patent
Ogawa

(10) Patent No.: US 8,416,940 B2
(45) Date of Patent: Apr. 9, 2013

(54) SUBSCRIBER ACCOMMODATING APPARATUS, TRANSFER CONTROL METHOD, COMMUNICATION SYSTEM, AND PROGRAM PRODUCT

(75) Inventor: Youichi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 825 days.

(21) Appl. No.: 12/270,986

(22) Filed: Nov. 14, 2008

(65) Prior Publication Data

US 2009/0129579 A1    May 21, 2009

(30) Foreign Application Priority Data

Nov. 21, 2007  (JP) ................................. 2007-301481

(51) Int. Cl.
*H04M 3/42* (2006.01)
*H04L 1/00* (2006.01)

(52) U.S. Cl. ............... 379/212.01; 379/201.01; 370/235

(58) Field of Classification Search ............. 379/212.01, 379/211.01, 201.01; 370/235, 236, 352
See application file for complete search history.

(56) References Cited

U.S. PATENT DOCUMENTS

| | | | | |
|---|---|---|---|---|
| 5,592,672 A * | 1/1997 | Grewal et al. | ................. | 718/105 |
| 5,917,804 A * | 6/1999 | Shah et al. | ................. | 370/230 |
| 6,442,138 B1 * | 8/2002 | Yin et al. | ................. | 370/232 |
| 6,459,681 B1 * | 10/2002 | Oliva | ................. | 370/232 |
| 6,490,249 B1 * | 12/2002 | Aboul-Magd et al. | ........ | 370/232 |
| 6,608,815 B1 * | 8/2003 | Huang et al. | ................. | 370/232 |
| 7,277,384 B1 * | 10/2007 | Chan et al. | ................. | 370/230 |
| 2005/0047340 A1 * | 3/2005 | Babiarz et al. | ................. | 370/231 |
| 2005/0207358 A1 * | 9/2005 | Nishida et al. | ................. | 370/261 |
| 2007/0223378 A1 * | 9/2007 | Take et al. | ................. | 370/235 |
| 2007/0233896 A1 * | 10/2007 | Hilt et al. | ................. | 709/238 |
| 2008/0225727 A1 * | 9/2008 | Yoshida et al. | ................. | 370/236 |

FOREIGN PATENT DOCUMENTS

| | | |
|---|---|---|
| JP | 03214951 A2 | 9/1991 |
| JP | 2001245345 A2 | 9/2001 |
| JP | 2004088666 A | 3/2004 |
| JP | 2005244964 A | 9/2005 |
| JP | 2005269217 A | 9/2005 |
| JP | 2006014021 A2 | 1/2006 |
| JP | 2007036813 A | 2/2007 |
| JP | 2007110411 A | 4/2007 |

OTHER PUBLICATIONS

European Search Report for EP 08 07 5844 completed Feb. 17, 2009.
Office action in JP counterpart patent application 2007-301481, dated Apr. 24, 2012.

* cited by examiner

*Primary Examiner* — William Deane, Jr.

(57) ABSTRACT

A subscriber accommodating apparatus which receives a call connection request from at least one subscriber terminal includes a control unit. The control unit compares a number of sessions under connection with a predetermined threshold value and controls a transfer of the call connection request according to the comparison result, when receiving the call connection request from the subscriber terminal.

20 Claims, 5 Drawing Sheets

SUBSCRIBER ACCOMMODATING APPARATUS, TRANSFER CONTROL METHOD, COMMUNICATION SYSTEM, AND PROGRAM PRODUCT

RELATED APPLICATION

This application is based upon and claims the benefit of priority from Japanese Patent Application No. JP 2007-301481 filed on Nov. 21, 2007, and including a specification, claims, drawings and summary. The disclosure of the above Japanese Patent Application is incorporated herein by reference in its entirety.

TECHNICAL FIELD

The present invention relates to a subscriber accommodating apparatus, a transfer control method, a communication system and a program product.

BACKGROUND ART

In recent years, a voice service in which a voice signal is IP packetized and the packetized voice signal is transmitted/received via an IP network is widely used in addition to a voice service that uses a telephone network. For example, Japanese Patent Application Laid-Open No. 2007-36813 discloses a voice service system using an SIP (Session Initiation Protocol). The system includes a plurality of subscriber terminals which are provided a voice service, a plurality of subscriber accommodating apparatuses which are provided at an access edge of an IP network and accommodate a subscriber terminal for each predetermined area unit, and at least one SIP server. In the system, when a source subscriber terminal communicates with a destination subscriber terminal, an SIP session connection request is transmitted from the source subscriber terminal to the SIP server via the subscriber accommodating apparatus. The SIP server which receives the connection request transmits the connection request to the destination subscriber terminal. Thereby, the SIP session is established between the source subscriber terminal and the destination subscriber terminal.

However, the subscriber accommodating apparatus in this system transfers all the SIP session connection requests transmitted from the subscriber terminals which are accommodated in the subscriber accommodating apparatus to the SIP server. Accordingly, in this system, there are concerns that the SIP server becomes congested when SIP session requests that exceed the processing capability of the SIP server are transferred to the SIP server. When the SIP server is in a congested state, problems occur in which the call connection process time becomes long, the SIP session connection request itself is disposed or the like.

For example, Japanese Patent Application Laid-Open No. 2007-110411 discloses the technology as one of technologies for solving the above-mentioned problem. In the technology, when many SIP session connection requests that exceed the processing capacity of the SIP server are generated, an access device transfers the session that cannot be processed to another device from the SIP server. Another device returns a voice response indicating that the connection to the session cannot be made.

For example, Japanese Patent Application Laid-Open No. 2005-269217 discloses the technology in which when the session connection request from a subscriber terminal exceeds a memory area for a call control that is assigned as a system in the SIP server, a part of the calls under communication is saved in an external storage device.

For example, Japanese Patent Application Laid-Open No. 2005-244964 discloses the security gateway which checks a number of simultaneous connection sessions in order to restrict that the clients having the same user ID perform a session setting simultaneously. The security gateway performs a session setting process to the session setting request when the number of simultaneous connection sessions does not exceed a predetermined value and performs an unauthorized connection prevention process when the number of simultaneous connection sessions exceeds the predetermined value. Here, the unauthorized connection prevention process is the process for preventing the session setting from being performed two or more than two times by the same user equipment. When it is determined that an old session is dead, the security gateway eliminates the old session and sets a new session. On the other hand, when it is determined that the old session is valid, the security gateway refuses the new session setting.

SUMMARY

An exemplary object of the present invention is to provide a subscriber accommodating apparatus, a transfer control method, a communication system and a program product, which can avoid a congestion of a call control apparatus, even if two or more call connection requests do concentrated generation.

According to one aspect of the invention, a subscriber accommodating apparatus which receives a call connection request from at least one subscriber terminal includes a control unit. The control unit compares a number of sessions under connection with a predetermined threshold value and controls a transfer of the call connection request according to the comparison result, when receiving the call connection request from the subscriber terminal.

According to another aspect of the invention, a transfer control method in a subscriber accommodating apparatus which controls a transfer of a call connection request received from at least one subscriber terminal includes comparing a number of sessions under connection with a predetermined threshold value when receiving a call connection request from the subscriber terminal, and controlling a transfer of the call connection request according to the comparison result.

According to another aspect of the invention, a communication system includes at least one subscriber terminal, a subscriber accommodating apparatus which accommodates the subscriber terminal in a predetermined area, and a call control apparatus which sets a call connection according to a call connection request received from the subscriber terminal via the subscriber accommodating apparatus. When the subscriber accommodating apparatus receives a call connection request from the subscriber terminal, the subscriber accommodating apparatus compares a number of sessions under connection with a predetermined threshold value and controls a transfer of the call connection request according to the comparison result.

According to another aspect of the invention, a program product relating to a subscriber accommodating apparatus which controls a transfer of a call connection request received from at least one subscriber terminal includes a computer-readable program code storage medium. The storage medium stores a program code for comparing the number of sessions under connection with a predetermined threshold value when receiving a call connection request from the subscriber terminal, and a program code for controlling a transfer of the call connection request according to the comparison result.

BRIEF DESCRIPTION OF THE DRAWINGS

Exemplary features and advantages of the present invention will become apparent from the following detailed description when taken with the accompanying drawings in which.

EXEMPLARY EMBODIMENTS

Each of the avoidance processes of congestion described in Japanese Patent Application Laid-Open No. 2007-110411 and Japanese Patent Application Laid-Open No. 2005-269217 mentioned above is the process that is carried out in a SIP (Session Initiation Protocol) server. Accordingly, when two or more SIP sessions do concentrated generation, in the end, the SIP server becomes congested and there is a possibility that the avoidance process in the SIP server may not be normally performed.

The security gateway described in Japanese Patent Application Laid-Open No. 2005-244964 performs the session connection setting by myself as well as the above mentioned SIP server. The gateway is different from the above subscriber accommodating apparatus which performs the control for transferring the session connection request to the SIP server.

That is, the process (for example, comparison and judgment of a number of simultaneous connection sessions) disclosed in Japanese Patent Application Laid-Open No. 2005-244964 is performed on the SIP server. Therefore, when a plurality of SIP session connection requests occur in clusters in instantaneous (burst), the congestion on the SIP server cannot be avoided by using the technology disclosed in Japanese Patent Application Laid-Open No. 2005-244964.

The above-mentioned problem can be solved with an exemplary embodiment of the present invention that is described in detail with reference to a drawing shown below.

Figure 1:
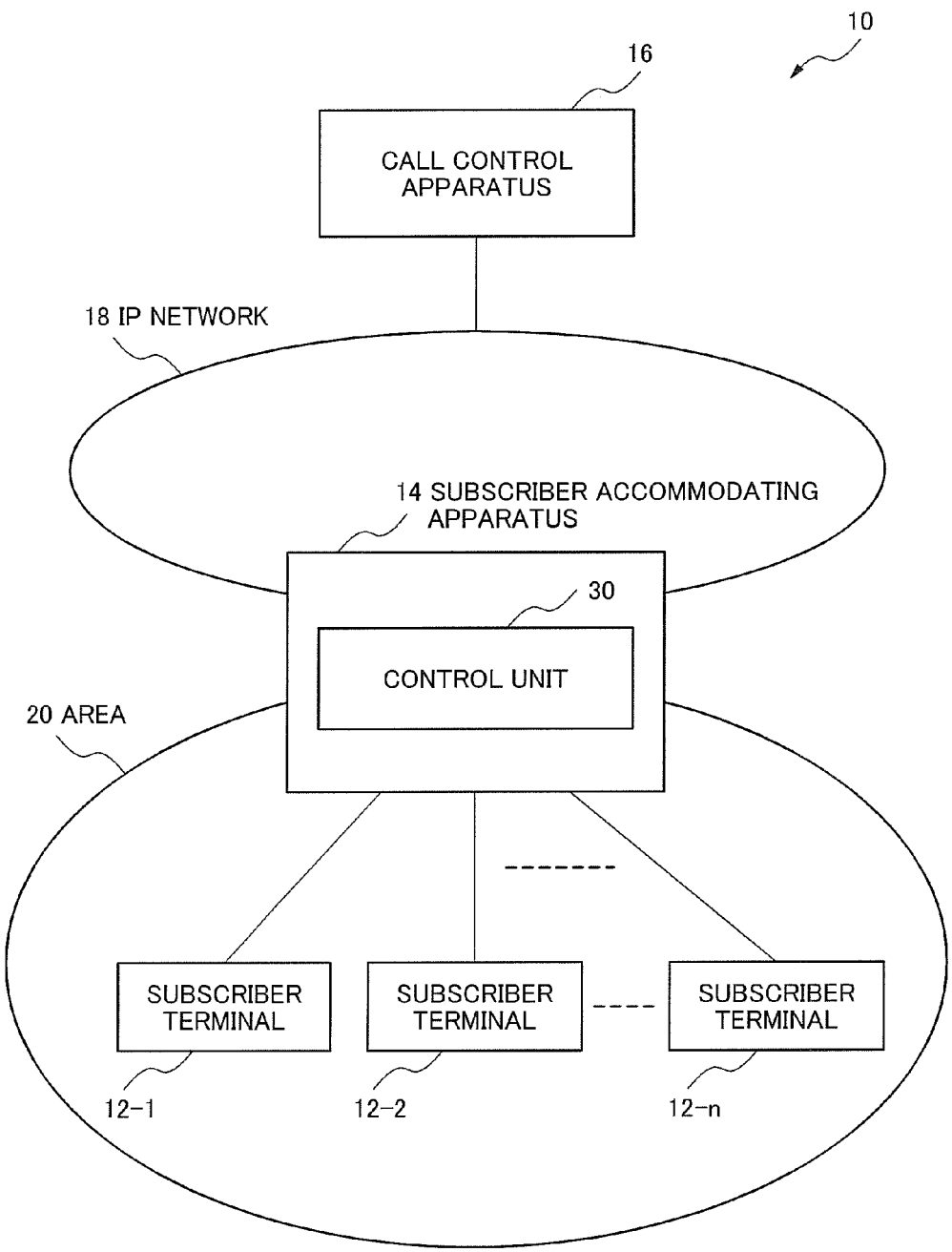
FIG. 1 is an example of a block diagram of a communication system according to a first exemplary embodiment of the present invention.

FIG. 1 is an example of a block diagram of a communication system 10 according to a first exemplary embodiment of the present invention. The communication system 10 is the system which provides a voice service by using a predetermined call control protocol. The communication system 10 includes a plurality of subscriber terminals 12-1 to 12-$n$, a subscriber accommodating apparatus 14 and a call control apparatus 16.

For example, when each of the subscriber terminals 12-1 to 12-$n$ initiates a voice communication with the other subscriber terminals, each of the subscriber terminals 12-1 to 12-$n$ transmits a call connection request to the subscriber accommodating apparatus 14.

The subscriber accommodating apparatus 14 is installed at an access edge of an IP network 18 and accommodates the subscriber terminals 12-1 to 12-$n$ in a predetermined area 20. The subscriber accommodating apparatus 14 transmits the call connection request received from the subscriber terminals 12-1 to 12-$n$ to the call control apparatus 16.

The call control apparatus 16 sets a call connection based on the call connection request received from the subscriber terminals 12-1 to 12-$n$ via the subscriber accommodating apparatus 14.

The subscriber accommodating apparatus 14 includes a control unit 30. When the control unit 30 receives the call connection request from any one of the subscriber terminals 12-1 to 12-$n$, the control unit 30 compares a number of the sessions under connection with a predetermined threshold value and controls a transfer of the call connection request based on the comparison result.

For example, when the number of the sessions under connection is equal to or smaller than the predetermined threshold value, the control unit 30 transmits the call connection request received from any one of the subscriber terminals 12-1 to 12-$n$ to the call control apparatus 16.

On the other hand, when the number of the sessions under connection is equal to or greater than the predetermined threshold value, the control unit 30 prohibits a transmission of the call connection request to the call control apparatus 16.

The subscriber accommodating apparatus 14 does not merely transmit the call connection request received from the subscriber terminals 12-1 to 12-$n$ to the call control apparatus 16. The subscriber accommodating apparatus 14 controls the transmission of the call connection request to the call control apparatus 16, according to the comparison result between the number of the sessions under connection and the predetermined threshold value.

Accordingly, even when the call connection request occurs in clusters in instantaneous (burst), the transmission of the call connection request from the subscriber accommodating apparatus 14 to the call control apparatus 16 is not continued endlessly. Therefore, the risk in which the call control apparatus 16 becomes further congested can be avoided.

Further, above mentioned "the number of the sessions under connection" may be a number of the sessions in the call control apparatus 16, or a number of the sessions accommodated in the area 20 by the subscriber accommodating apparatus 14.

Figure 2:
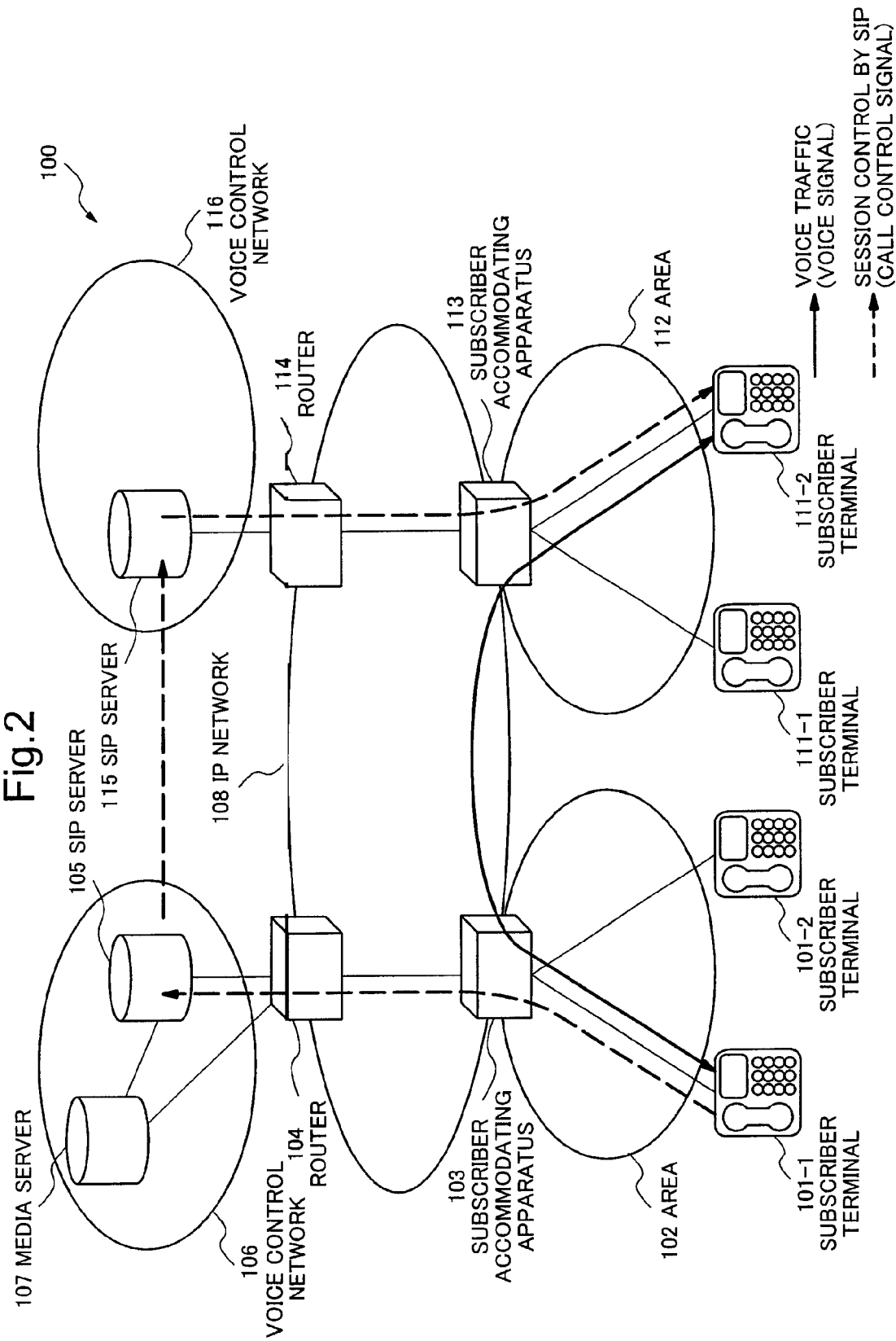
FIG. 2 is an example of a block diagram of a communication system according to a second exemplary embodiment of the present invention.

FIG. 2 is an example of a block diagram of a communication system 100 according to the second exemplary embodiment of the present invention. The communication system 100 is the system which provides a voice service by using a SIP as an example of a call control protocol. The communication system 100 includes subscriber terminals 101-1, 101-2, 111-1, and 111-2, subscriber accommodating apparatuses 103 and 113, routers 104 and 114, SIP servers 105 and 115, and a media server 107.

The subscriber terminals 101-1 and 101-2 exist in an area 102 which is covered by the subscriber accommodating apparatus 103 and receive a voice service from the SIP server 105. The subscriber terminals 111-1 and 111-2 exist in an area 112 which is covered by the subscriber accommodating apparatus 113 and receive a voice service from the SIP server 115. The number of the subscriber terminals which exist in each of the areas 102 and 112 is not limited to two and it may be three or more than three.

The subscriber accommodating apparatuses 103 and 113 and routers 104 and 114 exist in the IP network 108. The subscriber accommodating apparatus 103 accommodates subscriber terminals 101-1 and 101-2 in the area 102. The subscriber accommodating apparatus 103 performs transmission and reception of an IP packet between the subscriber terminals 101-1 and 101-2. The subscriber accommodating apparatus 113 accommodates the subscriber terminals 111-1 and 111-2 in the area 112. The subscriber accommodating apparatus 113 performs transmission and reception of the IP packet between the subscriber terminals 111-1 and 111-2. The router 104 is connected with the subscriber accommodating apparatus 103 and relays the IP packet transferred from the subscriber accommodating apparatus 103 to a voice control network 106. The router 114 is connected with the subscriber accommodating apparatus 113 and relays the IP packet transferred from the subscriber accommodating apparatus 113 to a voice control network 116.

The SIP server 105 is installed in the voice control network 106 and connected with the IP network 108 via the router 104. The SIP server 105 manages a call of the subscriber terminals 101-1 and 101-2 which exist in the area 102 and also performs a call setting according to a call control signal transmitted from the subscriber terminals 101-1 and 101-2, respectively. The SIP server 115 is installed in the voice control network 116 and connected with the IP network 108 via the router 114. The SIP server 115 manages a call of the subscriber terminals 111-1 and 111-2 which exist in the area 112 and also performs a call setting according to a call control signal transmitted from the subscriber terminals 111-1 and 111-2, respectively.

In the exemplary embodiment, the case in which communication is performed between the subscriber terminal 101-1 which exists in the area 102 and the subscriber terminal 111-2 which exists in the area 112 will be described as an example. In this case, the SIP server 105 which manages the subscriber terminal 101-1 that exists in the area 102 receives an SIP session connection request from the subscriber terminal 101-1. The SIP server 105 transfers the received SIP session connection request to the SIP server 115 which manages the subscriber terminal 111-2 that is a connection destination in the area 112. Here, the SIP session connection request is one of the call control signals and it is the signal for requesting a call connection.

The SIP server 115 notifies the subscriber terminal 111-2 that is a connection destination of the call arrival. The SIP session is established between the subscriber terminal 101-1 and the subscriber terminal 111-2. After establishing the SIP session, voice communication is achieved by performing a routing process on the IP network 108 with a RTP (Real-time Transport Protocol) packet transfer between the subscriber accommodating apparatus 103 and the subscriber accommodating apparatus 113. In FIG. 2, the route on which the call control signal is transmitted is indicated by a broken line, and the route on which the voice signal is transmitted is indicated by a solid line.

For example, the media server 107 is installed in the voice control network 106. The media server 107 provides predetermined information (for example, voice information indicating that a congested state occurs or the like) to the subscriber terminal 101-1 or the like. The subscriber accommodating apparatus 103 can directly communicate with the media server 107 without accessing the SIP server 105. The media server 107 receives the SIP session connection request from the subscriber accommodating apparatus 103. The media server 107 transmits the voice information indicating that the connection cannot be made to the subscriber terminal which transmits the SIP session connection request via the subscriber accommodating apparatus 103.

Figure 3:
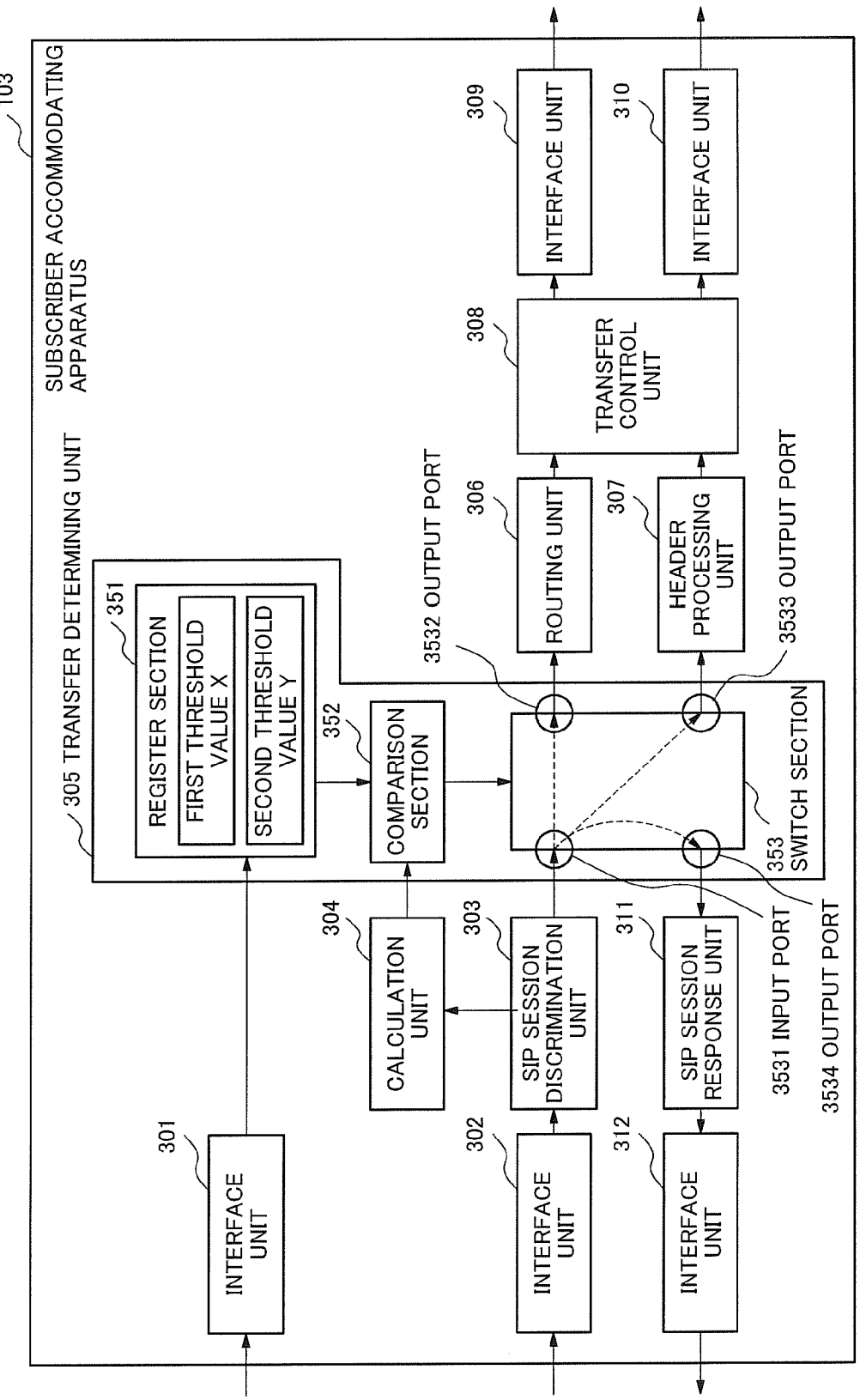
FIG. 3 is an example of a block diagram of a subscriber accommodating apparatus shown in FIG. 2.

FIG. 3 is an example of a block diagram of the subscriber accommodating apparatus 103 shown in FIG. 2. The subscriber accommodating apparatus 103 includes interface units 301, 302, 309, 310, and 312, an SIP session discrimination unit 303, a calculation unit 304, a transfer determining unit 305, a routing unit 306, a header processing unit 307, a transfer control unit 308 and an SIP session response unit 311. Here, it is assumed that the configuration of the subscriber accommodating apparatus 113 installed in the area 112 is the same as that of the subscriber accommodating apparatus 103.

The interface unit 301 is the interface which connects the subscriber accommodating apparatus 103 with the SIP server 105 or an arbitrary apparatus (not shown). The interface unit 301 outputs the information received from the SIP server 105 or the arbitrary apparatus to the transfer determining unit 305.

The interface unit 302 is the interface which connects the subscriber accommodating apparatus 103 with the subscriber terminals 101-1 and 101-2. The interface unit 302 outputs the voice traffic and the SIP session connection request to the SIP session discrimination unit 303.

The SIP session discrimination unit 303 extracts the SIP session connection request from the voice signal and the call control signal inputted from the interface unit 302. The SIP session discrimination unit 303 outputs the extracted SIP session connection request to the calculation unit 304 and the transfer determining unit 305. In this case, the information output from the SIP session discrimination unit 303 is not limited to the SIP session connection request. For example, it may be the information indicating that the SIP session connection request has been extracted.

The calculation unit 304 inputs the SIP session connection request (or the information indicating that the SIP session connection request has been extracted) from the SIP session discrimination unit 303. The calculation unit 304 has a counter (not shown) which holds the number of the SIP sessions under connection. Whenever the calculation unit 304 receives the SIP session connection request from the subscriber terminal, the calculation unit 304 increments the counter and outputs the updated counter value to the transfer determining unit 305.

The transfer determining unit 305 includes a register section 351, a comparison section 352 and a switch section 353. The register section 351 holds at least one threshold value. Here, the threshold value is the information for determining a process to the SIP session connection request received from the subscriber terminal. For example, it is assumed that only the first threshold value X is set.

When the counter value (the number of the SIP sessions under connection) updated by the calculation unit 304 is smaller than the first threshold value X, it can be assumed that the SIP server 105 has enough processing capacity.

Therefore, in this case, the SIP session connection request received from the subscriber terminal is transmitted to the SIP server 105. That is, the SIP server 105 receives the SIP session connection request and establishes the SIP session.

On the other hand, when the counter value is greater than the first threshold value X, it can be assumed that the SIP server 105 has not enough processing capacity (that is, there is a possibility that the SIP server 105 is in the congested state).

Therefore, in this case, a transmission of the SIP session connection request received from the subscriber terminal to the SIP server 105 is prohibited. That is, because the SIP session connection request is not received by the SIP server 105, the SIP session can not be established.

Additionally, for example, it is assumed that the first threshold value X and a second threshold value Y that is greater than the first threshold value X are set. When the updated counter value is smaller than the first threshold value X, the SIP session connection request received from the subscriber terminal is transmitted to the SIP server 105 as mentioned above. When the counter value updated by the calculation unit 304 is greater than the first threshold value X and smaller than the second threshold value Y, it can be assumed that the SIP server 105 is in the congested state and the voice control network 106 itself is not in the congested state.

Therefore, in this case, the SIP session connection request received from the subscriber terminal is directly transmitted to the media server 107 from the subscriber accommodating apparatus 103 without accessing the SIP server 105.

When the counter value updated by the calculation unit 304 is greater than the second threshold value Y, it can be assumed that not only the SIP server 105 but also the voice control network 106 itself are in the congested state.

Therefore, in this case, the SIP session connection request received from the subscriber terminal is not transmitted to both the SIP server 105 and the media server 107. In this case, the predetermined information indicating that the connection cannot be made is transmitted to the subscriber terminal which transmits the SIP session connection request.

The comparison section 352 compares the counter value updated by the calculation unit 304 with the threshold value held by the register section 351. The switch section 353 includes an input port 3531 to which the SIP session connection request outputted from the SIP session discrimination unit 303 is inputted. The switch section 353 includes a plurality of output ports 3532 to 3534 for outputting the SIP session connection request. The switch section 353 outputs the SIP session connection request from any one of the output ports 3532 to 3534 according to the comparison result of the comparison section 352.

The routing unit 306 inputs the SIP session connection request outputted from the output port 3532 of the switch section 353, performs address resolution for the SIP servers 105, and outputs it to the transfer control unit 308. The header processing unit 307 converts the header of the SIP session connection request outputted from the output port 3533 of the switch section 353 into the predetermined header and outputs it to the transfer control unit 308.

The transfer control unit 308 outputs the SIP session connection request outputted from the routing unit 306 to the interface unit 309. The transfer control unit 308 outputs the SIP session connection request outputted from the header processing unit 307 to the interface unit 310.

The interface unit 309 transmits the SIP session connection request outputted from the transfer control unit 308 to the SIP server 105. The interface unit 310 transmits the SIP session connection request outputted from the transfer control unit 308 to the media server 107.

The SIP session response unit 311 inputs the SIP session connection request from the output port 3534, generates an error message indicating that the service cannot be provided to the subscriber terminal 101-1 which transmits the SIP session connection request and outputs the error message to the interface unit 312.

The interface unit 312 transmits the error message outputted from the SIP session response unit 311 to the subscriber terminal 101-1.

Figure 4:
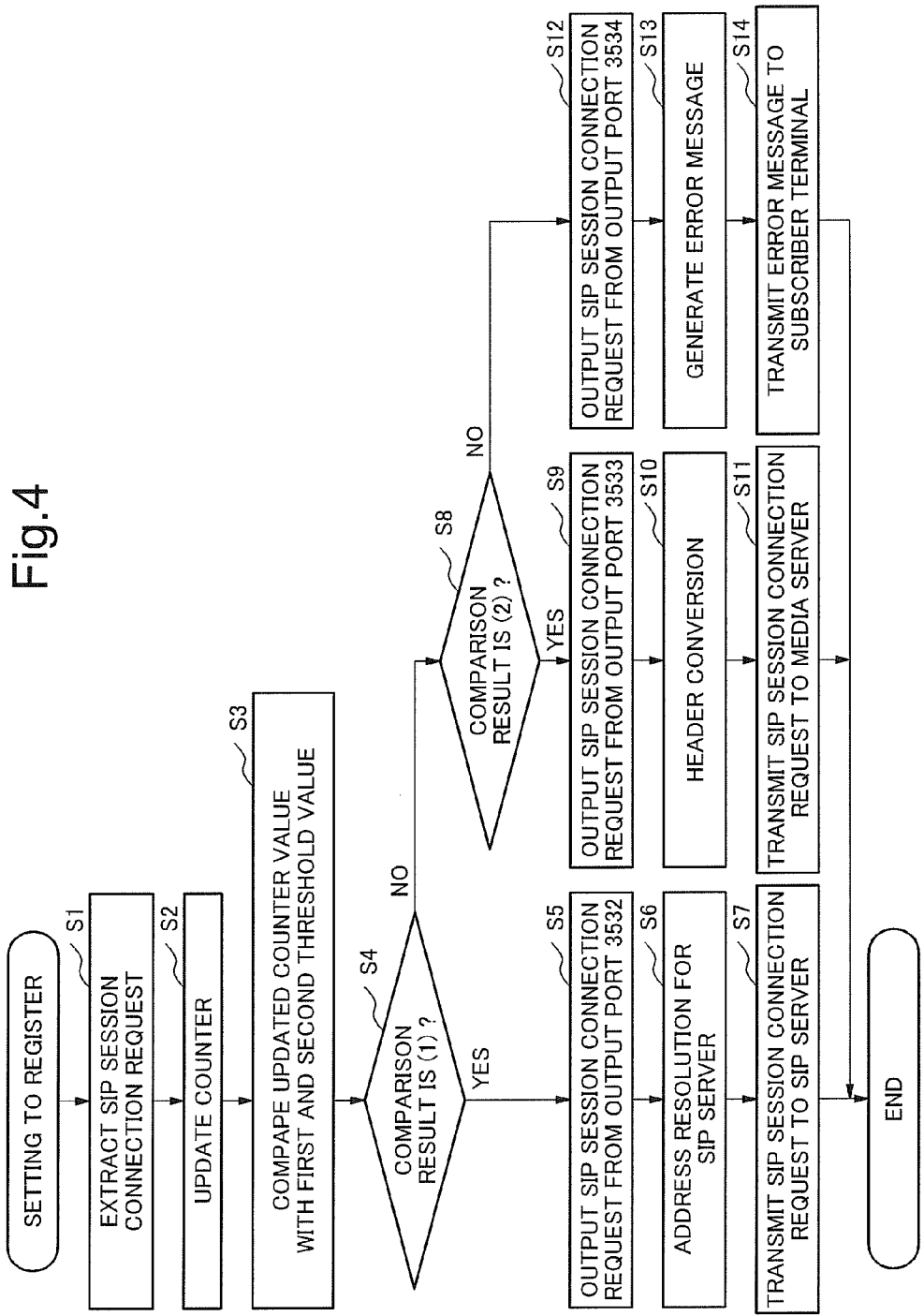
FIG. 4 is a flowchart for illustrating a transfer control method of a SIP session connection request in a communication system shown in FIG. 2.

FIG. 4 is a flowchart illustrating a transfer control method of the SIP session connection request in the communication system shown in FIG. 2. Further, hereinafter, the case in which the subscriber terminal 101-1 shown in FIG. 2 transmits the SIP session connection request will be described as an example. Hereinafter, a transfer control method of the SIP session connection request according to two threshold values (the first threshold value X and the second threshold value Y) mentioned above will be described. These threshold values are stored in the register section 351 in advance before performing a process indicated below.

The SIP session discrimination unit 303 receives the voice signal and the call control signal from the subscriber terminal 101-1 via the interface unit 302. The SIP session discrimination unit 303 extracts the SIP session connection request from those signals (Step S1).

The SIP session discrimination unit 303 outputs the extracted SIP session connection request to the calculation unit 304 and the switch section 353 of the transfer determining unit 305. The calculation unit 304 which receives the SIP session connection request increments the counter which holds the number of the SIP sessions under connection (Step S2).

The calculation unit 304 outputs the updated counter value to the comparison section 352 of the transfer determining unit 305. The comparison section 352 compares the updated counter value with the first threshold value X and the second threshold value Y, and outputs a comparison result signal (Step S3). In this case, the comparison result signal will indicate one of the following comparison result: (1) the updated counter value is smaller than the first threshold value X; (2) the updated counter value is greater than the first threshold value X and smaller than the second threshold value Y; (3) the updated counter value is greater than the second threshold value Y.

Further, in case of the comparison result (1), it can be assumed that the SIP server 105 has enough processing capacity. In case of the comparison result (2), it can be assumed that the SIP server 105 is in the congested state but the voice control network 106 itself is not in the congested state. In case of the comparison result (3), it can be assumed that not only the SIP server 105 but also the voice control network 106 itself are in the congested state. This comparison result is outputted from the comparison section 352 to the switch section 353.

A process is performed in the switch section 353 according to the comparison result. In case of the comparison result (1) ("Yes" judgment in Step S4/in the case that the updated counter value is smaller than the first threshold value X), the switch section 353 outputs the SIP session connection request inputted from the input port 3531 from the output port 3532 to the routing unit 306 (Step S5).

The routing unit 306 inputs the SIP session connection request outputted from the output port 3532 and performs address resolution for the SIP servers 105 (Step S6). The SIP session connection request to which the address resolution is performed is transmitted to the SIP server 105 via the transfer control unit 308 and the interface unit 309 from the routing unit 306 (Step S7).

In case of the comparison result (2) ("Yes" judgment in Step S8/in the case that the updated counter value is greater than the first threshold value X and smaller than the second threshold value Y), the switch section 353 outputs the SIP session connection request inputted from the input port 3531 to the header processing unit 307 through the output port 3533 (Step S9).

The header processing unit 307 converts the header of the SIP session connection request outputted from the output port 3533 into the header addressed to the media server 107 (Step S10). The SIP session connection request to which a header conversion is performed is transmitted to the media server 107 via the transfer control unit 308 and the interface unit 310 from the header processing unit 307 (Step S11). The media server 107 which receives the SIP session connection request from the subscriber accommodating apparatus 103 transmits the predetermined voice information indicating that the connection cannot be made to the subscriber terminal that transmits the SIP session connection request via the subscriber accommodating apparatus 103. Further, in this case, the SIP session connection request is directly transmitted to the media server 107 without accessing the SIP server 105. Header information for transmitting it to the media server 107 is stored in the header processing unit 307 in advance.

In case of the comparison result (3) ("No" judgment in Step S8/in the case that the updated counter value is greater than the second threshold value Y), the switch section 353 outputs the SIP session connection request inputted from the input port 3531 to the SIP session response unit 311 from the output port 3534 (Step S12).

The SIP session response unit 311 inputs the SIP session connection request from the output port 3534 and generates an error message indicating that the service is not provided to the subscriber terminal 101-1 which transmits the SIP session connection request (Step S13).

The generated error message is transmitted to the subscriber terminal 101-1 via the interface unit 312 from the SIP session response unit 311 (Step S14). In this case, the error message that is transmitted to the subscriber terminal 101-1 can be stored in the SIP session response unit 311 in advance.

Further, in case of the comparison result (2) and the comparison result (3), the SIP session connection request from the subscriber terminal is not transmitted to the SIP server 105. That is, in these cases, the call connection is not set. Accordingly, the calculation unit 304 decrements the counter when the process according to these comparison results ends.

As described above, when the subscriber accommodating apparatus 103 of the second exemplary embodiment receives the SIP session connection request from the subscriber terminal 101-1, it compares the number of the SIP sessions under connection with the predetermined threshold value showing that the SIP server 105 and the voice control network 106 are in the congested state. The subscriber accommodating apparatus 103 carries out a transfer control according to the comparison result. By carrying out such transfer control, not only the congestion state in the SIP server 105 can be avoided but also the congestion state in the media server 107 and the voice control network 106 can be avoided.

Moreover, not only in the case in which the SIP server 105 is in the congested state but also in the case in which the media server 107 is in the congested state, the information indicating that the connection cannot be made is certainly transmitted to the subscriber terminal 101-1 that requests a session connection. Accordingly, the subscriber terminal 101-1 can recognize that the SIP server 105 and the like are in the congested state. Further transmissions of the SIP session connection request are suppressed. Because the unnecessary transmission of the SIP connection request is suppressed, the congestion state of the IP network 108 and a radio network can be avoided.

By the way, usually, the SIP server 105 processes the SIP session connection request in the order in which it was received. Therefore, when the SIP server 105 is in the congested state, the execution of the SIP session connection request that has been received late is not guaranteed. When the SIP session connection request of an emergency communication call in which it is essential to secure a communication path is accepted in the congested state, the problem in which the emergency communication call cannot be processed occurs. Here, the emergency communication call is a call of an emergency response agency such as a police office or a fire department. Accordingly, it is necessary to process the SIP session connection request of the emergency communication call mentioned above in preference to the other SIP session connection request.

Figure 5:
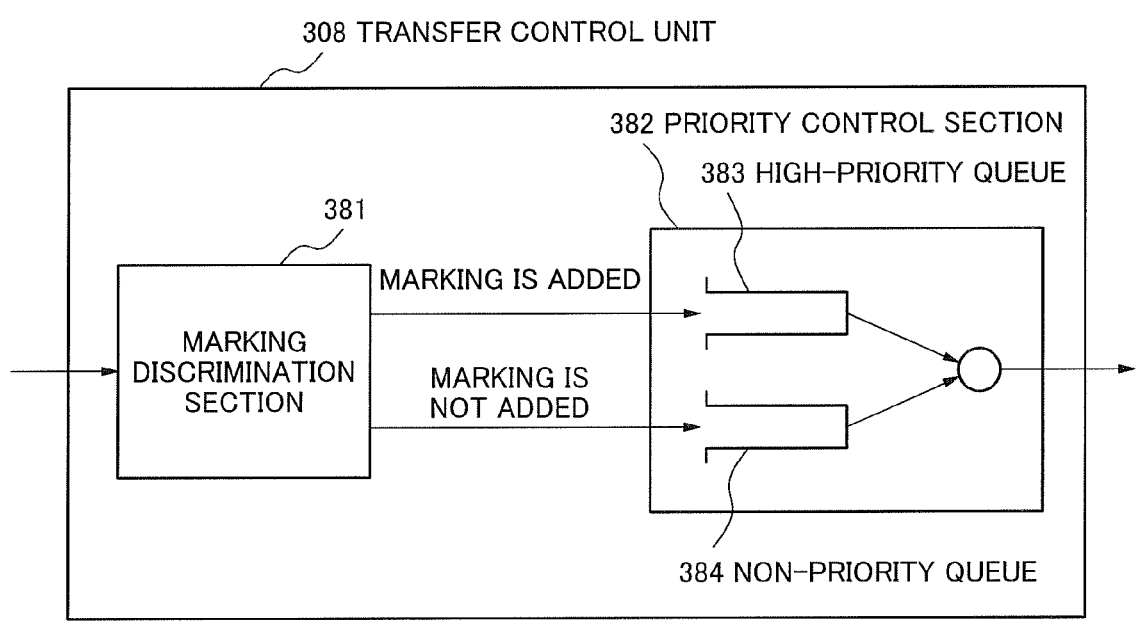
FIG. 5 is an example of a block diagram of a transfer control unit of a subscriber accommodating apparatus in a communication system according to a third exemplary embodiment of the present invention.

FIG. 5 is an example of a block diagram of the transfer control unit 308 of the subscriber accommodating apparatus in the communication system according to the third exemplary embodiment of the present invention. The transfer control unit 308 includes a marking discrimination section 381 and a priority control section 382. The priority control section 382 includes a high-priority queue 383 and a non-priority queue 384. The marking discrimination section 381 discriminates whether or not a marking is added to the SIP session connection request that is inputted to the transfer control unit 308. The priority control section 382 inputs the SIP session connection request to either the high-priority queue 383 or the non-priority queue 384 according to whether the marking is added or not. The priority control section 382 outputs the SIP session connection request that is inputted to the high-priority queue 383 in preference to the SIP session connection request that is inputted to the non-priority queue 384 to the interface unit 309.

Hereinafter, a method for processing the SIP session connection request of the emergency communication call by using the above-mentioned transfer control unit 308 will be described. When the SIP session connection request is inputted to the subscriber accommodating apparatus 103, the SIP session discrimination unit 303 (FIG. 3) extracts a session identifier in an SIP session connection request message. Here, the session identifier is the information for identifying the other party. By the session identifier, the call of the session can be identified as the emergency communication call or a normal connection call. That is, by confirming the session identifier, the priority of the call can be recognized. The SIP session discrimination unit 303 adds the marking that indicates a priority of transfer to the SIP session connection request according to the extracted session identifier. Here, for example, the case in which the marking was added to only the SIP session connection request of the emergency communication call having a high priority is shown as an example.

The SIP session connection request to which the marking is added is transmitted from the SIP session discrimination unit 303 to the switch section 353 of the transfer determining unit 305. The switch section 353 determines whether or not the marking is added to the SIP session connection request. When it is determined that the marking is added, the switch section 353 does not perform a switching of the output port according to the result of the comparison with the threshold value mentioned above and outputs the SIP session connection request from the output port 3532.

The SIP session connection request outputted from the output port 3532 is inputted to the transfer control unit 308 via the routing unit 306. The marking discrimination section 381 of the transfer determining unit 308 determines whether or not the marking is added to the SIP session connection request. When it is determined that the marking is added, the marking discrimination section 381 outputs the SIP session connection request to the high-priority queue 383 of the priority control section 382. When it is determined that the marking is not added, the marking discrimination section 381 outputs the SIP session connection request to the non-priority queue 384 of the priority control section 382.

The SIP session connection request that is inputted to the high-priority queue 383 is transmitted to the SIP server 105 in preference to the SIP session connection request that is inputted to the non-priority queue 384.

As described above, the subscriber accommodating apparatus of the third exemplary embodiment adds the marking to the SIP session connection request according to the session identifier. The subscriber accommodating apparatus transmits the SIP session connection request to which the marking is added to the SIP server 105 in preference to the SIP session connection request to which the marking is not added (or a low-priority marking is added). That is, even when the SIP session connection request of an emergency communication call is accepted in the congested state, those emergency communication calls can be secured.

By the way, the threshold value (for example, the first threshold value X and the second threshold value Y) for determining a process of the SIP session connection request can be changed dynamically by the instruction from the SIP server 105. For example, the subscriber accommodating apparatus 103 can replace the threshold value that is already with the threshold value received from the SIP server 105. In this case, the information transmitted from the SIP server 105 is not limited to the threshold value and it may be the information about the state of the SIP server 105 (for example, a normal state or a congested state). The subscriber accommodating apparatus 103 may provide a threshold value table in which the state of the SIP server 105 is associated with the threshold value. The subscriber accommodating apparatus 103 can decide the threshold value by searching for the table according to the received status information from SIP server 105.

The SIP server 105 can transmit information about a transfer destination of the SIP session connection request to the subscriber accommodating apparatus 103 via the interface unit 301 according to the processing state. The subscriber accommodating apparatus 103 transfers the SIP session connection request to the transfer destination indicated by the notification. The SIP server 105 can directly control the switch section 353 of the transfer determining unit 305 via the interface unit 301. The SIP server 105 can dynamically set a transfer destination address of the SIP session connection request to the header processing unit 307 via the interface unit 301. That is, the SIP session connection request is transmitted to an arbitrary SIP server or an arbitrary media server, respectively.

As described above, by performing the transfer control of the SIP session connection request in the subscriber accommodating apparatus 103 at SIP server 105 side, the transfer control can be appropriately carried out according to the actual state of the SIP server 105.

The subscriber accommodating apparatus 103 according to the above-mentioned exemplary embodiments may be configured by dedicated hardware. On the other hand, a program realizing each process function is recorded in a readable recording medium which can be read out by the subscriber accommodating apparatus 103. A CPU (Central Processing Unit) or the like executes the program recorded in the recording medium. The readable recording medium that can be read by the subscriber accommodating apparatus 103 is a movable recording medium such as a floppy disk (registered trademark), a magneto optical disk, a DVD (Digital Versatile Disk), a CD (Compact Disc) and additionally, a HDD (Hard Disk Drive) or the like that is installed in the subscriber accommodating apparatus 103.

A communication system according to a fourth exemplary embodiment of the present invention is a communication system comprising a subscriber accommodating apparatus which is connected with a subscriber terminal held by a subscriber and transfers the voice signal and the call connection request signal transmitted from the subscriber terminal by using a predetermined port; and a call control apparatus which performs a call setting according to the call connection request signal transmitted from the subscriber terminal via the subscriber accommodating apparatus. The subscriber accommodating apparatus transfers the call connection request signal to the call control apparatus according to the number of session connections processed by the call control apparatus and a predetermined threshold value.

A subscriber accommodating apparatus according to a fifth exemplary embodiment of the present invention is a subscriber accommodating apparatus which is connected with a subscriber terminal held by a subscriber; and transmits/receives the voice signal and the call connection request signal transmitted from the subscriber terminal by using a predetermined port. The subscriber accommodating apparatus transfers the call connection request signal to a call control apparatus according to the number of session connections processed by the call control apparatus which performs a call setting according to the call connection request signal transmitted from the subscriber terminal via the subscriber accommodating apparatus and a predetermined threshold value.

A traffic control method according to a sixth exemplary embodiment of the present invention is a traffic control method in a subscriber accommodating apparatus which is connected with a subscriber terminal held by a subscriber and transmits/receives the voice signal and the call connection request signal transmitted from the subscriber terminal by using a predetermined port. The traffic control method carries out a process in which the number of session connections that are processed by a call control apparatus which performs a call setting according to the call connection request signal transmitted from the subscriber terminal via the subscriber accommodating apparatus is counted, a process in which the number of session connections is compared with a predetermined threshold value, and a process in which the call connection request signal is transferred to the call control apparatus according to the comparison result.

A program according to a seventh exemplary embodiment of the present invention is a program which causes a computer in a subscriber accommodating apparatus which is connected with a subscriber terminal held by a subscriber and transmits/receives the voice signal and the call connection request signal transmitted from the subscriber terminal by using a predetermined port to perform a process. The program causes the computer in the subscriber accommodating apparatus to carry out a procedure in which the number of session connections that are processed by a call control apparatus which performs a call setting according to the call connection request signal transmitted from the subscriber terminal via the subscriber accommodating apparatus is counted, a procedure in which the number of session connections is compared with a predetermined threshold value, and a procedure in which the call connection request signal is transferred to the call control apparatus according to the comparison result. The program is stored in a storage medium.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

Further, it is noted that the inventor's intent is to retain all equivalents of the claimed invention even if the claims are amended during prosecution.

What is claimed is:

1. A subscriber accommodating apparatus which receives a call connection request from at least one subscriber terminal comprising:
    a control unit which compares a number of sessions under connection with a predetermined threshold value and controls a transfer of said call connection request according to the comparison result, when receiving said call connection request from said subscriber terminal, wherein
    when said number of sessions under connection is smaller than said threshold value, said control unit transfers said call connection request to a call control apparatus,
    when said number of sessions under connection is greater than said threshold value, said control unit prohibits transferring said call connection request to said call control apparatus,
    communication between said at least one subscriber terminal and said call control apparatus occurs through said subscriber accommodating apparatus, and
    said number of sessions under connection refers to a number of sessions in said call control apparatus as opposed to a number of sessions accommodated by said subscriber accommodating apparatus.

2. A subscriber accommodating apparatus which receives a call connection request from at least one subscriber terminal comprising:
    a calculation unit which counts a number of sessions under connection;
    a comparison unit which compares said number of sessions with at least one predetermined threshold value and outputs a comparison result; and
a switch unit which controls a transfer of said call connection request according to said comparison result, wherein
    when said comparison unit determines that said number of sessions is smaller than said threshold value, said switch unit transfers said call connection request to a call control apparatus,
    when said comparison unit determines that said number of sessions is greater than said threshold value, said switch unit prohibits transferring said call connection request to said call control apparatus,
    communication between said at least one subscriber terminal and said call control apparatus occurs through said subscriber accommodating apparatus, and
    said number of sessions under connection refers to a number of sessions in said call control apparatus as opposed to a number of sessions accommodated by said subscriber accommodating apparatus.

3. The subscriber accommodating apparatus according to claim 2, wherein
    when said comparison unit determines that said number of sessions is greater than said threshold value, said switch unit transfers said call connection request to a server which can be directly accessed by said subscriber accommodating apparatus without accessing said call control apparatus.

4. The subscriber accommodating apparatus according to claim 3, wherein
    predetermined information indicating that a call connection cannot be made to the subscriber terminal that transmits the call connection request is received from the server to which said call connection request is transferred.

5. The subscriber accommodating apparatus according to claim 2, further comprising
    a response unit which transmits predetermined information indicating that a call connection cannot be made to the subscriber terminal that transmits said call connection request when said comparison unit determines that said number of sessions is greater than said threshold value.

6. The subscriber accommodating apparatus according to claim 2, further comprising:
    an addition unit which analyses an identifier of a call connection request received from said subscriber terminal and adds a predetermined mark to the call connection request when it is recognized that the identifier is a specific identifier; and
    a transfer control unit which transfers the call connection request to which said mark is added to said call control apparatus in preference to the call connection request to which said mark is not added.

7. The subscriber accommodating apparatus according to claim 2, further comprising:
    an interface unit which receives a predetermined information from at least said call control apparatus.

8. The subscriber accommodating apparatus according to claim 7, wherein
    said switch unit transfers said call connection request according to transfer destination information received from said call control apparatus via said interface unit.

9. The subscriber accommodating apparatus according to claim 7, further comprising:
    a register unit which holds said threshold value.

10. The subscriber accommodating apparatus according to claim 9, wherein
    said threshold value in said register unit is set by a direction from said call control apparatus via said interface unit.

11. The subscriber accommodating apparatus according to claim 2, wherein
    said comparison unit compares said number of sessions with a first threshold value and a second threshold value that is greater than the first threshold value.

12. The subscriber accommodating apparatus according to claim 11, wherein
    when said comparison unit determines that said number of session connections is smaller than said first threshold value, said switch unit transfers said call connection request to said call control apparatus.

13. The subscriber accommodating apparatus according to claim 11, wherein
    when said comparison unit determines that said number of session connections is greater than said first threshold value and smaller than said second threshold value, said switch unit transfers said call connection request to a server which can be directly accessed by said subscriber accommodating apparatus without accessing said call control apparatus.

14. The subscriber accommodating apparatus according to claim 11, wherein
    when said comparison unit determines that said number of session connections is greater than said second threshold value, a predetermined information indicating that a call connection cannot be made is transmitted to a subscriber terminal which transmits said call connection request.

15. A transfer control method in a subscriber accommodating apparatus which controls a transfer of a call connection request received from at least one subscriber terminal comprising:

comparing a number of sessions under connection with a predetermined threshold value when receiving a call connection request from said subscriber terminal; and controlling a transfer of said call connection request according to the comparison result, wherein when said number of sessions under connection is smaller than said threshold value, said control unit transfers said call connection request to a call control apparatus, when said number of sessions under connection is greater than said threshold value, said control unit prohibits transferring said call connection request to said call control apparatus, communication between said at least one subscriber terminal and said call control apparatus occurs through said subscriber accommodating apparatus, and said number of sessions under connection refers to a number of sessions in said call control apparatus as opposed to a number of sessions accommodated by said subscriber accommodating apparatus.

16. The transfer control method according to claim 15, further comprising:

analyzing an identifier of a call connection request received from said subscriber terminal;

adding a predetermined mark to the call connection request when it is recognized that the identifier is a specific identifier; and transferring a call connection request to which said mark is added to said call control apparatus in preference to a call connection request to which said mark is not added.

17. The transfer control method according to claim 16, wherein the process for transferring the call connection request to which said mark is added to the call control apparatus in preference to the call connection request to which said mark is not added includes: a step for skipping a comparison between a number of sessions under connection and said threshold value when the call connection request to which said mark is added is received; a step for storing the call connection request to which said mark is added in a high-priority queue; and a step for transferring the call connection request stored in the high-priority queue to said call control apparatus in preference to the call connection request stored in a queue other than the high-priority queue.

18. A communication system comprising:

at least one subscriber terminal;

a subscriber accommodating apparatus which accommodates said subscriber terminal in a predetermined area; and a call control apparatus which sets a call connection according to a call connection request received from said subscriber terminal via said subscriber accommodating apparatus, wherein when said subscriber accommodating apparatus receives a call connection request from said subscriber terminal, said subscriber accommodating apparatus compares a number of sessions under connection with a predetermined threshold value and controls a transfer of said call connection request according to the comparison result, when said number of sessions under connection is smaller than said threshold value, said control unit transfers said call connection request to said call control apparatus, when said number of sessions under connection is greater than said threshold value, said control unit prohibits transferring said call connection request to said call control apparatus, communication between said at least one subscriber terminal and said call control apparatus occurs through said subscriber accommodating apparatus, and said number of sessions under connection refers to a number of sessions in said call control apparatus as opposed to a number of sessions accommodated by said subscriber accommodating apparatus.

19. A non-transitory computer-readable medium for storing computer executable instructions for performing a transfer control method in a subscriber accommodating apparatus which controls a transfer of a call connection request received from at least one subscriber terminal, the method comprising:

comparing a number of sessions under connection with a predetermined threshold value when receiving a call connection request from said subscriber terminal; and controlling a transfer of said call connection request according to the comparison result, wherein when said number of sessions under connection is smaller than said threshold value, said control unit transfers said call connection request to a call control apparatus, when said number of sessions under connection is greater than said threshold value, said control unit prohibits transferring said call connection request to said call control apparatus, communication between said at least one subscriber terminal and said call control apparatus occurs through said subscriber accommodating apparatus, and said number of sessions under connection refers to a number of sessions in said call control apparatus as opposed to a number of sessions accommodated by said subscriber accommodating apparatus.

20. A subscriber accommodating apparatus which receives a call connection request from at least one subscriber terminal comprising:

calculation means for counting a number of sessions under connection;

comparison means for comparing said number of sessions and at least one predetermined threshold value; and switch means for controlling a transfer of said call connection request according to said comparison result, wherein when said comparison means determines that said number of sessions is smaller than said threshold value, said switch means transfers said call connection request to a call control apparatus, when said comparison means determines that said number of sessions is greater than said threshold value, said switch means prohibits transferring said call connection request to said call control apparatus, communication between said at least one subscriber terminal and said call control apparatus occurs through said subscriber accommodating apparatus, and said number of sessions under connection refers to a number of sessions in said call control apparatus as opposed to a number of sessions accommodated by said subscriber accommodating apparatus.

* * * * *